United States Patent [19]

Barzuza

[11] Patent Number: 5,268,095
[45] Date of Patent: Dec. 7, 1993

[54] SELF-CLEANING FILTER

[75] Inventor: Ytzhak Barzuza, Petach Tikvah, Israel

[73] Assignee: Filtration Ltd., Herslia, Israel

[21] Appl. No.: 707,615

[22] Filed: May 30, 1991

[30] Foreign Application Priority Data

Jun. 6, 1990 [IL] Israel .................................. 94630

[51] Int. Cl.$^5$ .............................................. B01D 29/00
[52] U.S. Cl. ................................... 210/143; 210/333.1; 210/393; 210/406; 210/408; 210/411; 210/413
[58] Field of Search ........... 210/106, 107, 108, 333.01, 210/393, 409, 411, 413, 412, 143, 406, 407, 408

[56] References Cited

U.S. PATENT DOCUMENTS

| | | | |
|---|---|---|---|
| 2,608,910 | 9/1952 | McCrystle | 210/409 |
| 2,835,390 | 9/1954 | King | 210/414 |
| 2,889,048 | 6/1959 | Nordin | 210/409 |
| 4,156,651 | 5/1979 | Mehoudar | 210/488 |
| 4,201,672 | 5/1980 | Kenyon | 210/409 |
| 4,203,836 | 5/1980 | Hallack et al. | 210/406 |
| 4,285,353 | 8/1981 | Colomer | 210/409 |
| 4,431,541 | 2/1984 | Lee | 210/412 |
| 4,643,828 | 2/1987 | Barzuza | 210/412 |
| 4,655,937 | 4/1987 | Hendrix | 210/391 |
| 4,676,893 | 6/1987 | Travade et al. | 210/333.01 |
| 4,929,363 | 5/1990 | Barzuza | 210/111 |
| 5,000,850 | 3/1991 | Berry | 210/406 |
| 5,124,029 | 6/1992 | Fjallstrom et al. | 210/391 |

FOREIGN PATENT DOCUMENTS

| | | |
|---|---|---|
| 58656 | 8/1982 | European Pat. Off. |
| 0164932 | 12/1985 | European Pat. Off. |
| 240220 | 10/1987 | European Pat. Off. |
| 620477 | 10/1935 | Fed. Rep. of Germany |
| 3537138 | 4/1987 | Fed. Rep. of Germany |
| 633092 | 1/1928 | France |
| 480083 | 12/1969 | Switzerland |

*Primary Examiner*—Peter Hruskoci
*Assistant Examiner*—Robert James Popovics
*Attorney, Agent, or Firm*—Sandler, Greenblum & Bernstein

[57] ABSTRACT

A self-cleaning filter including a filter housing having at least a raw-liquid inlet and a clean-liquid outlet, a filter medium interposed between the raw-liquid inlet and the clean-liquid outlet At least one nozzle is located in proximity to the filter medium and is connectable to at least two different sources of pressure, one of which pressures is higher than the pressure prevailing in the filter, the other one being lower than the pressure prevailing in the filter There is also provided an arrangement to produce a relative movement between the filter medium and the at least one nozzle to the effect of having a substantial part of the surface area of the filter medium covered by the nozzle.

21 Claims, 6 Drawing Sheets

SELF-CLEANING FILTER

It is known to clean filters by means of liquid jets produced by a pressure differential between the filter during flushing, and some pressure source.

Such a source can be a pressure pump supplying liquid at a pressure higher than filter pressure, or a suction pump providing pressure lower than filter pressure. If the filter is under high pressure, the open atmosphere constitutes an equivalent of a low pressure source.

While a high pressure differential between filter and source, producing a high-velocity jet, does indeed ensure efficient filter cleaning, it also results in serious filter wear and excessive liquid consumption during flushing. Low pressure differentials, on the other hand, by failing to remove clinging solids (such as, e.g., algae), will lead to gradual filter blockage.

In the so-called open filters in which pressure in the filters is atmospheric and which, at least during flushing, are only partly filled with liquid and partly with air, a second system of jet-producing nozzles is sometimes used that turns the entire filter inflow into a plurality of jets. The drawback of this kind of filter resides in the fact that it tends to disintegrate particles rather than intercept and trap them, thus producing a turbid, muddy liquid.

A filter is known (EPA 0 164932) in which an attempt is made to overcome some of the above difficulties by combining, during filter cleaning, the effects of jet and suction nozzles. However, the jet effect, being produced by liquid pressure inside the filter, is thus quite limited and even more limited is the suction effect, which is solely due to an induction effect produced by the jet nozzle.

It is one of the objects of the invention to overcome the drawbacks and disadvantages of the prior art filters and to provide a self-cleaning filter, the cleaning capacity of which is high without endangering the integrity of the filter medium, and without disintegrating soft dirt particles.

According to the invention, this is achieved by providing a self-cleaning filter comprising a filter housing having at least a raw-liquid inlet and a clean-liquid outlet, a filter medium interposed between said raw-liquid inlet and said clean-liquid outlet, at least one nozzle located in proximity to said filter medium and connectable to at least two different sources of pressure, one of which pressures is higher than the pressure prevailing in said filter; the other one being lower than the pressure prevailing in said filter; and means to produce a relative movement between said filter medium and said at least one nozzle, to the effect of having a substantial part of the surface area of said filter medium covered by said nozzle.

The different pressure sources produce different fluid streams through the nozzle or nozzles. In order to protect the filter medium, it is preferable that these streams should differ significantly in velocity or impact, and stronger streams be applied for a shorter time period and/or with moderate area coverage, so that major dirt removal is effected by the relatively weak stream, while the strong stream is used to remove stubbornly clinging particles and its impact on the screen is relatively limited.

Furthermore, it has been found advantageous that the high-velocity stream be controllable, with this stream being maintained for a relatively long time period at a low velocity and for short periods of time being applied at high velocity.

The invention will now be described in connection with certain preferred embodiments, with reference to the following illustrative FIGURES so that it may be more fully understood.

With specific reference now to the FIGURES in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 3:
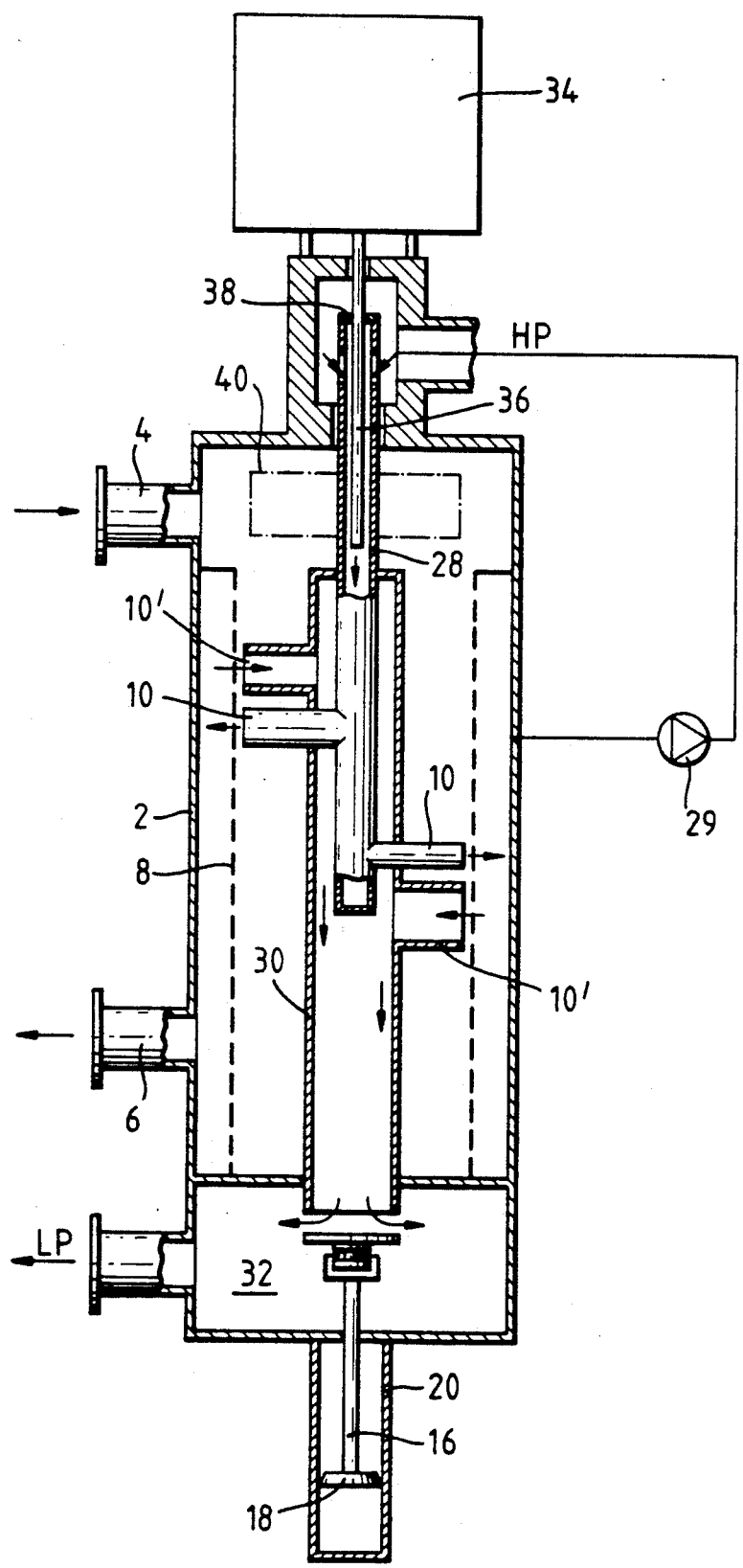
Figure 4:
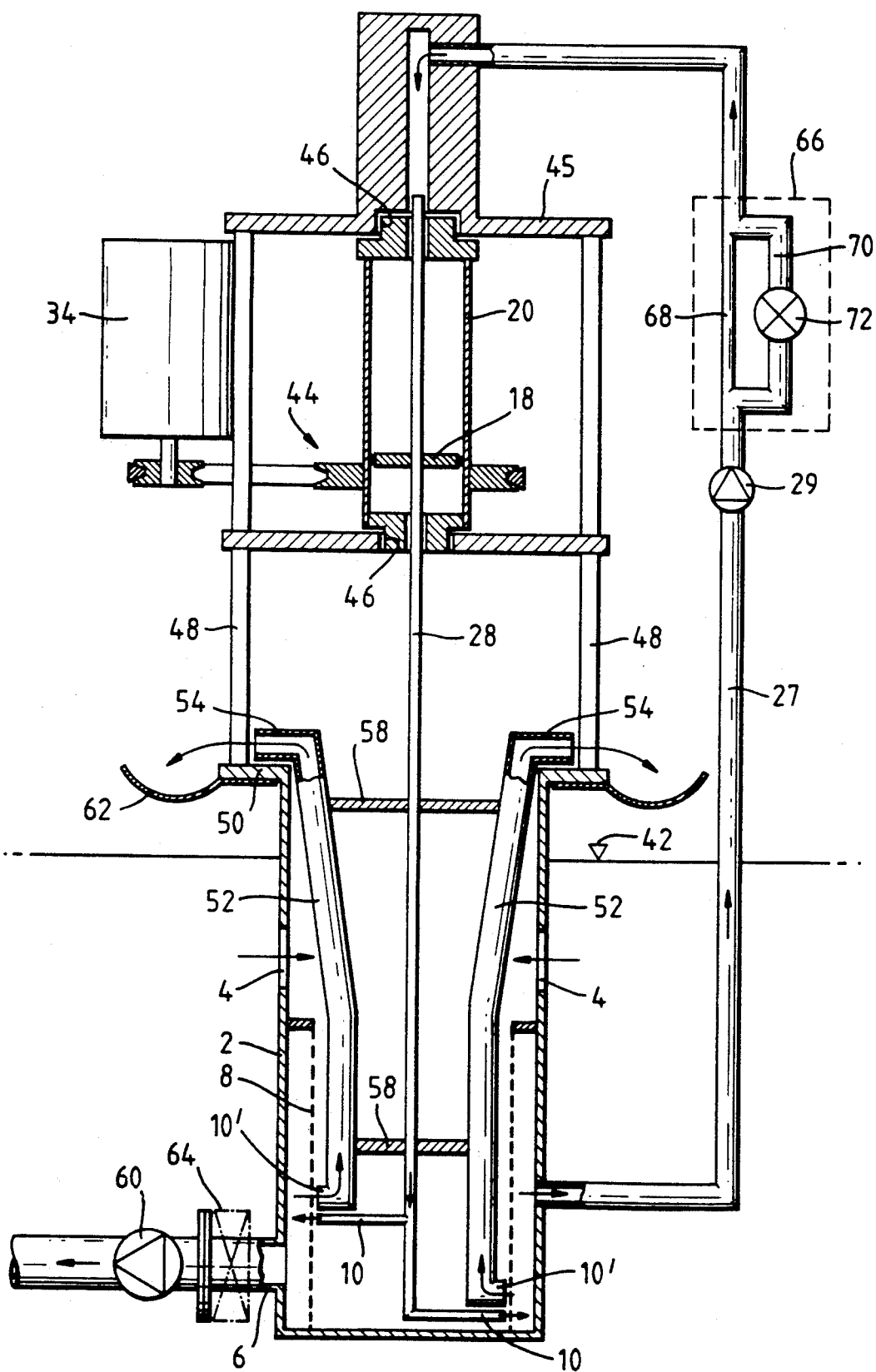
Figure 5:
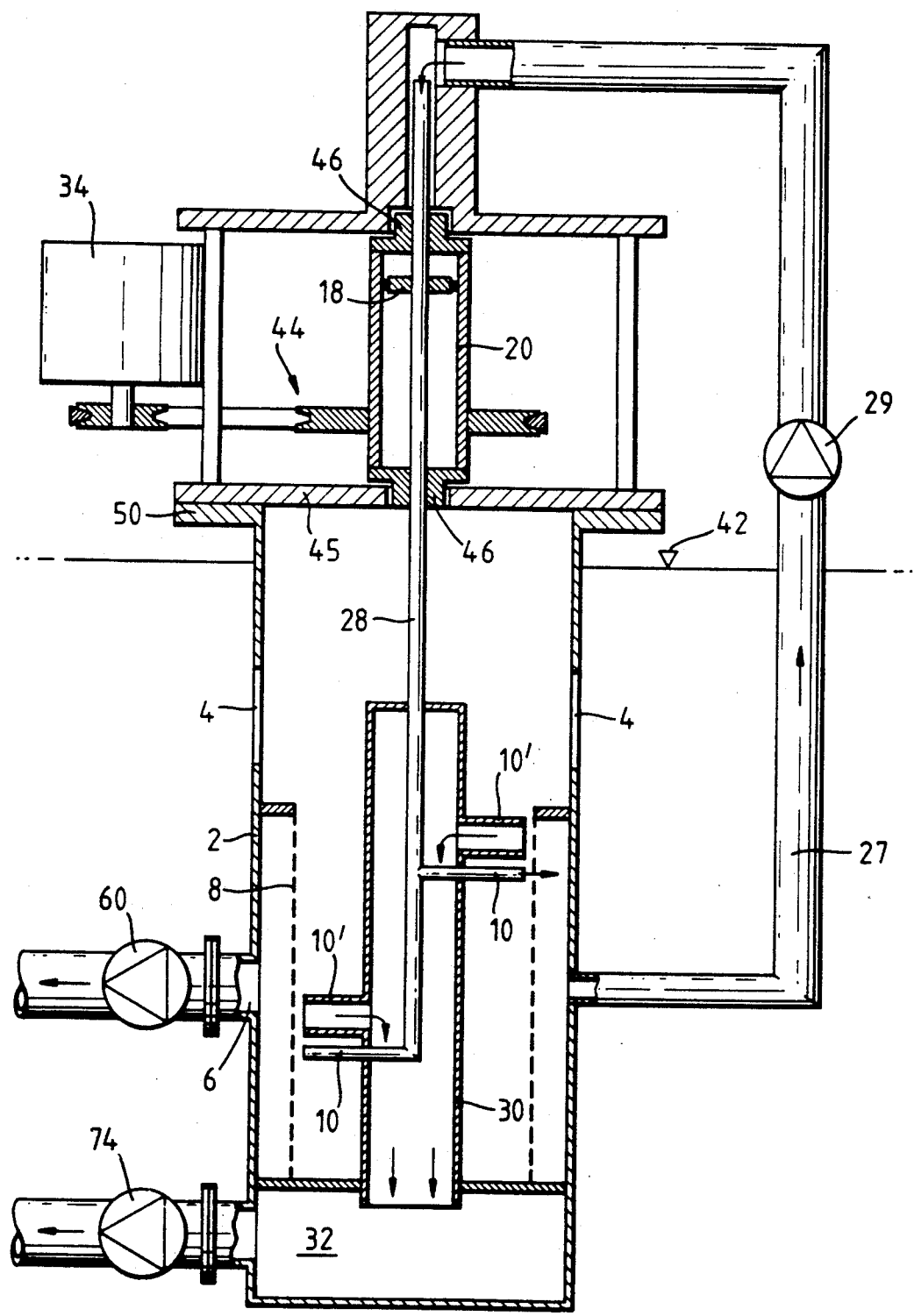

FIG. 3 schematically represents a third embodiment of the invention;

FIG. 4 shows a submersible embodiment of the filter according to the invention;

FIG. 5 represents another embodiment of this type, and

Figure 6:
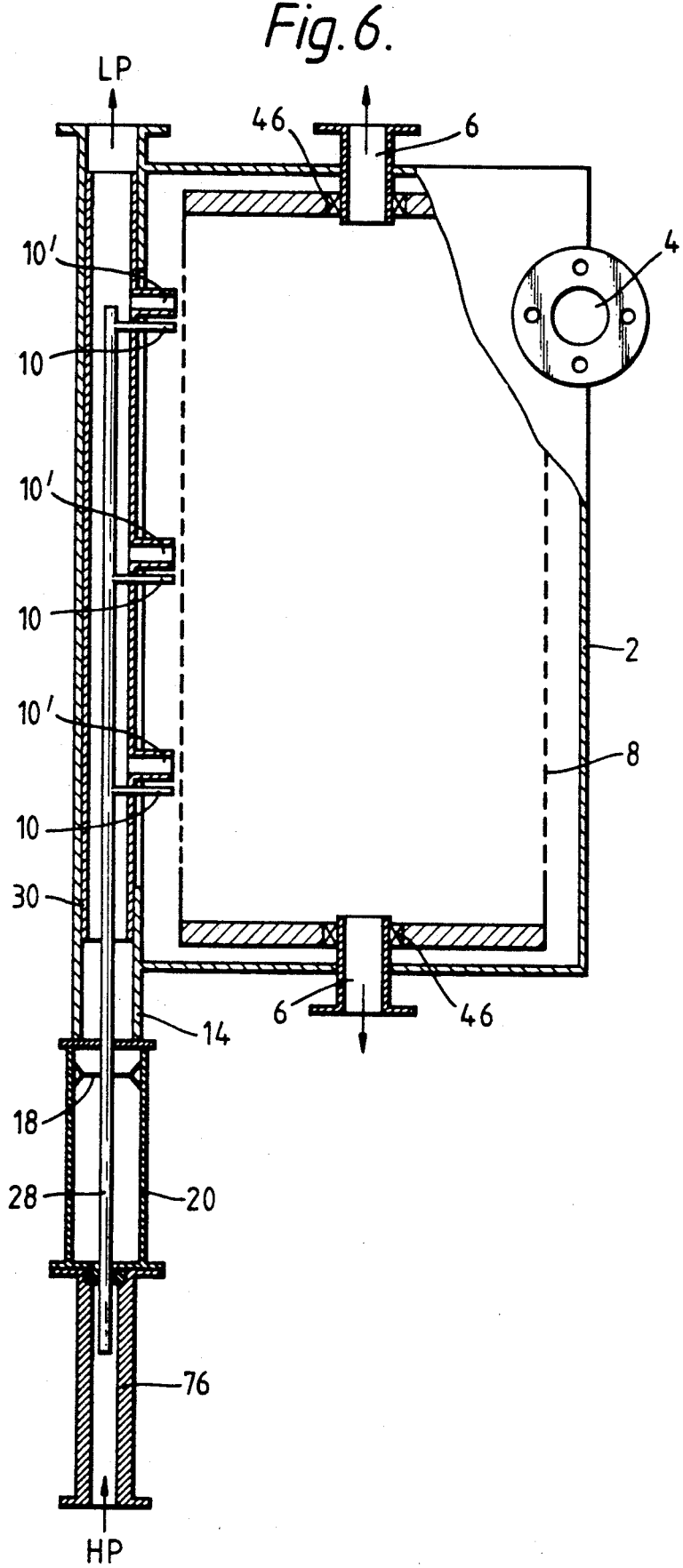

FIG. 6 schematically shows yet another embodiment of the invention.

Figure 1:
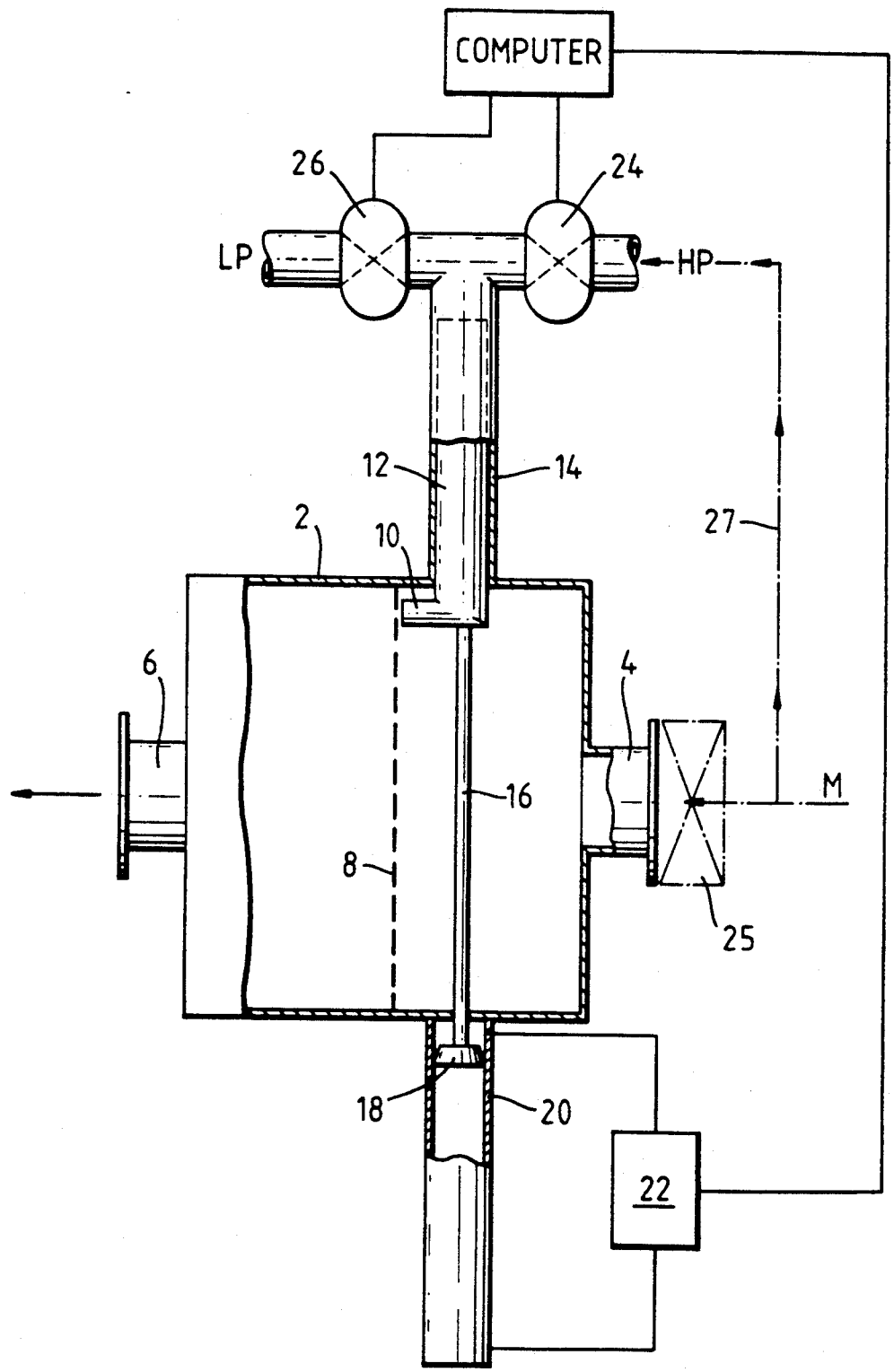
FIG. 1 is a schematic representation of a first embodiment of the invention.

Referring now to the drawings, there is seen in FIG. 1 a filter housing 2, a raw-liquid inlet 4 and a clean-liquid outlet 6. Inside the housing 2 there is located a substantially flat filter medium 8. Also seen is a nozzle 10, located in close proximity to the filter medium 8. The nozzle 10 is mounted in a tube 12, itself slidably and sealingly accommodated in a guide tube 14. At its other side, the nozzle 10 is linked to the piston rod 16 and piston 18 of a hydraulic cylinder 20.

The slot-shaped nozzle 10 is of course wide enough to cover substantially the entire width of the filter medium 10. Thus, when the piston 18 is impacted from above and moves downwards, it pulls down the nozzle 10 which, in one stroke, covers the entire filter surface.

The valving 22 of the hydraulic cylinder is controlled by a programmable computer which also controls the valve 24, which provides access to high pressure HP (e.g., liquid coming from a pump), and the valve 26 which provides access to low pressure LP. As pressure inside the filter housing 2 is usually several atmospheres, the required source of low pressure is simply the open atmosphere.

With the valve 24 open and valve 26 shut, the nozzle 10 will thus act as a pressure nozzle, producing a jet that at least initiates the loosening of the solids entrapped in the filter mesh. When valve 24 is now shut and valve 26 is opened, the pressure differential between the relatively high filter pressure and the atmospheric pressure causes the liquid in the filter to flow in direction of the lower, i.e., atmospheric pressure, thereby turning the nozzle 10 from a pressure nozzle into a suction nozzle. These alternating nozzle actions also pry loose the most stubborn deposits, with the nozzle 10 in its suction mode scooping up the released solids. The relatively small flushing-liquid quantities exiting through the LP side are usually led back to the reservoir, where the raw liquid came from in the first place.

If the filter inlet 4 is supplied by a pressure source, the above-mentioned HP source can be dispensed with, by providing an additional valve 25 at the inlet 4, advantageously also computer-controlled, and a pipe 27 branching off the mains M and leading to the valve 24. During the high-pressure cycle of the nozzle 10, the valve 25 is closed, causing filter pressure to drop and the valve 24 to open, producing the jet effect.

The suction-pressure sequences can be preprogrammed and coordinated with the hydraulic cylinder which produces the reciprocating nozzle movement It is thus possible to have one full stroke in the pressure mode and the next stroke in the suction mode, or pressure and suction can succeed one another several times during the same stroke, or any other conceivable sequence.

Figure 2:
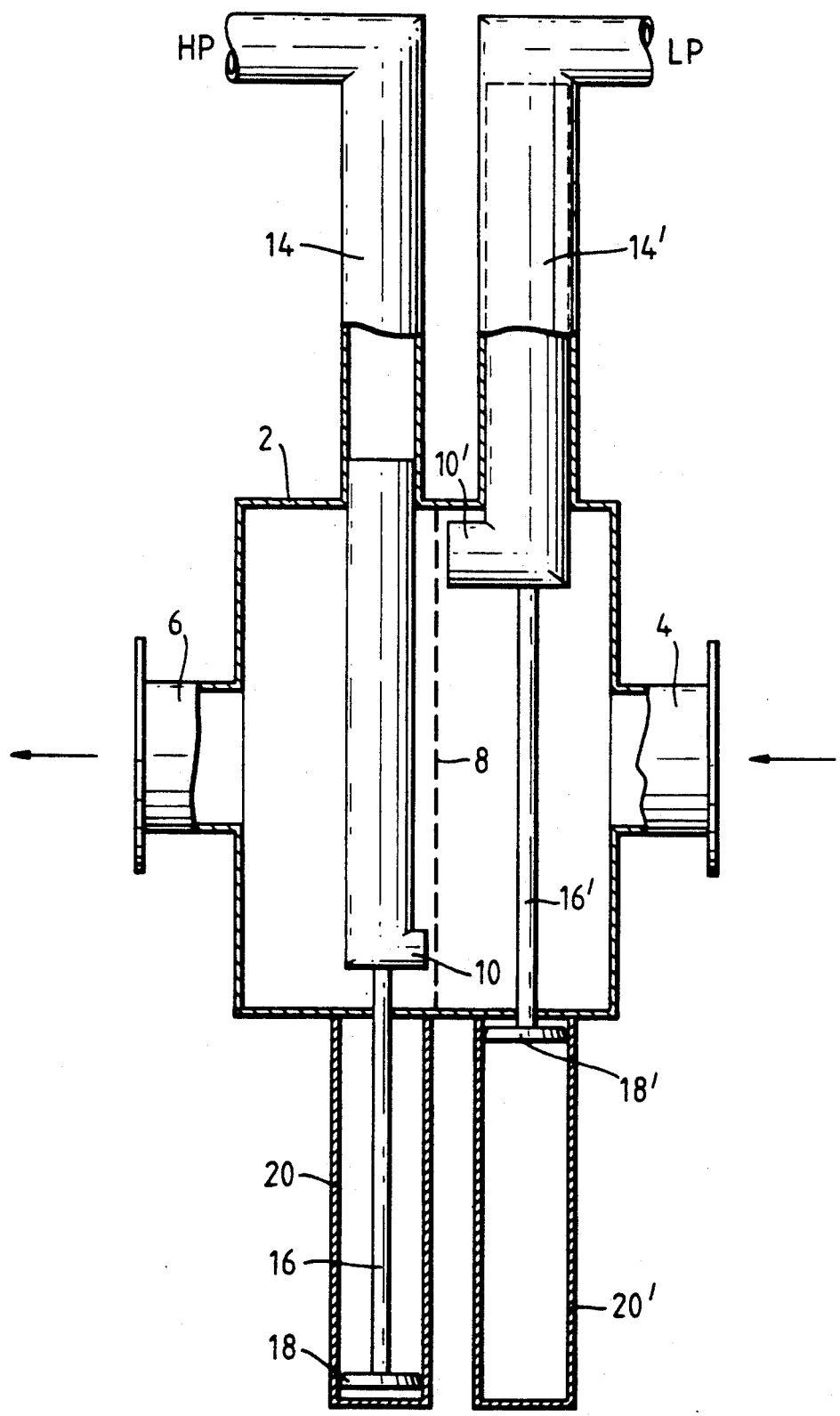
FIG. 2 is a similar illustration of a second embodiment of the invention.

The embodiment of FIG. 2, also a filter with a flat filter medium 8, has two nozzles: nozzle 10, which is a relatively narrow, high-pressure nozzle, and nozzle 10', which is a relatively large suction nozzle. Each nozzle has its own guide tube 14 or 14' and its own hydraulic cylinder 20 or 20'. While the drawing (in which the controls have been omitted) shows the nozzles to work in "counter-phase", they can also move with one nozzle opposite the other. They may also be arranged to move at different speeds, with the suction nozzle 10' advantageously noving at a higher speed, i.e., having a higher area covering rate than the pressure nozzle 10. Moreover, the above-said notwithstanding, both nozzles 10, 10' can be pressure nozzles, i.e., the pressures behind both of them, while arranged to be unequal, may be higher than the pressure inside the filter.

The nozzles may also be located on the same side of the filter medium, rather than as shown in FIG. 2.

The filter illustrated in FIG. 3 differs from the previously discussed embodiments in many details: the filter medium 8 is cylindrical and the nozzles 10, 10', in order to cover the entire filter medium 8, must perform a helical movement, i.e., a translational movement upon which is superposed a rotational movement.

In order to reduce the required piston stroke length, two axially offset pairs of nozzles 10, 10' are provided, nozzle 10 again being the narrower, pressure nozzle and nozzle 10' being the wider, suction nozzle.

To avoid problems of dynamic imbalance, the two nozzle pairs have also been offset angularly and are located in a common plane, but on opposite sides of the axis.

There are seen two concentric tubes, an inner tube 28 which provides access to the high-pressure liquid HP provided, e.g., by a pump 29, and which communicates with the pressure nozzles 10, and an outer tube 30, communicating with the suction nozzles 10', and from which the flushing liquid can exit into a sump 32 and thence into the atmosphere.

The entire nozzle unit is imparted a reciprocating translational movement by the hydraulic cylinder 20.

Rotation of the nozzle unit is effected by an electric motor 34 mounted on the housing 2 and provided with a splined shaft 36 engaging a splined washer 38 rigidly attached to the inner tube 28, and permits the latter, relative to the motor shaft 38, one degree of freedom in translation only.

As already mentioned, the superposition of the translational movement produced by the hydraulic cylinder 20, and the rotational movement produced by the electric motor, result in the nozzles 10, 10' describing a helical path which permits them to cover the entire filter surface.

While each nozzle pair 10, 10' is drawn as if lying in a common radial plane, it has been found advantageous to have the suction nozzle 10' lead the pressure nozzle 10 in direction of rotation by a small angle, in order for the pressure nozzle 10 to impact only those areas that have already been swept by the suction nozzles 10'.

The rotational movement of the nozzle unit can also be produced by a vane 40 (indicated by dash-dotted lines), fixedly attached to the tube 28 and adapted to be set rotating by the inflowing raw liquid To this end, the raw-liquid inlet socket 4 is attached to the housing 2 not in the usual radial direction, but in a substantially tangential direction. This produces a vortex in the inlet space adajcent to the inlet 4, which vortex sets the vane 40 rotating, thereby obviously also rotating the entire nozzle unit.

The electric motor 34 could also be replaced by a pneumatic or hydraulic motor and the nozzle unit could also be rotated by a combination of a motor and a vane set rotating by a tangential inflow.

In some applications, the flushing arrangement is allowed to work continuously, while in others the pressure difference between the raw-liquid inlet 4 and the clean-liquid outlet is monitored. When, due to progressive clogging of the filter medium, this difference exceeds a limit value, the flushing arrangement is automatically activated until the pressure difference is again reduced to below the limit value.

The embodiment shown in FIG. 4 is designed to work in partial submersion in any body of liquid, for example, a pool, reservoir or river, the depth of submersion being indicated by the liquid level mark 42.

The housing 2 which accommodates the cylindrical filter screen 8 has one or more inlet openings 4 which, in practice, are advantageously covered with a coarse screen, to keep out trash and other gross impurities. As in the embodiment of FIG. 3, cleaning is effected by two axially offset pairs of nozzles which, rotating and reciprocating, are adapted to practically sweep the entire screen surface, nozzles 10 being high-pressure nozzles and nozzles 10' being suction or low-pressure nozzles. The sweeping mechanism comprises a central tube 28 with access to high- pressure liquid provided via a line 27 by the pump 29 and supplying the pressure nozzles 10. The tube 28, carrying the entire nozzle arrangement, is also rigidly connected to the piston 18 of a hydraulic cylinder 20 which imparts to the tube 28 the required reciprocating movement, while the rotary movement of the nozzle arrangement is produced by the electric motor 34 via a belt and pulley drive 44. The cylinder 20 is mounted between plates 45 and rotates in bearings 46. A key-and-groove arrangement (not shown) permits the tube 28, relative to the cylinder 20, one degree of freedom in translation only. The cylinder 20 is connected to the source of fluid power via per se known rotary connectors (not shown).

The motor-hydraulic cylinder unit is mounted by means of several rigid rods or tubes 48 on the flange 50 of the filter housing 2.

The suction nozzles 10', disposed in proximity to the pressure nozzles 10, are mounted at the lower ends of suction ducts 52 which, within the screen 8, extend in a direction parallel to the central tube 28, but then continue in an outward tilt, as seen in the drawing, and end in substantially horizontal spouts 54. The cross-section of the ducts 52 and the spouts 54 is larger than that of the suction nozzles 10'. The ducts 52 with their nozzles 10' and their spouts 54 are firmly attached to the central tube 28 by means of stays 58.

To the filter outlet 6 is attached a pump 60, which draws the cleaned liquid and transports it to the consumer While the cleaning function of the nozzles 10, 10' themselves has been explained above, the source of low pressure needed for the suction effect is no longer the connection to the atmosphere as in the embodiments of FIGS. 1 to 3, but the centrifugal-pump effect of the inclined portions of the suction ducts 52 when rotating. Upon rotation, the inclination of these portions produces in the liquid mass inside these portions an outwardly directed radial component which causes the liquid to be continuously expelled through the spouts 54, producing at the nozzles 10' the desired suction effect. Due to the above-mentioned differences in cross-section, the entrance velocity at the suction nozzles 10' is larger than the ejection velocity at the spouts 54, enhancing the cleaning effect.

The flushing liquid ejected from the spouts 54 is either intercepted by a gutter 62 and thence drawn off for eventual disposal, or else dumped right back into the body of liquid whence it came.

An optional attachment would be a controllable valve 64 coordinated with a pressure sensor responding to the differences of pressure at both sides of the screen 8. When, due to filter fouling, this differential exceeds a predetermined limit value, the valve 64 is shut and, by thus reducing the pressure differential, enhances the cleaning effect of the suction nozzles 10'.

An improvement in the service life of the filter screen 8 is obtainable by means of a pressure booster 66 insertable into the high-pressure line upstream of the pump 29 and comprising a constriction 68 in the form of a relatively narrow pipe section and a. larger-cross-section bypass 70 controlled by a valve 72. For routine cleaning operations, the high-pressure nozzles are supplied via the flow-reducing constriction 68, the bypass 70 being closed by valve 72. This produces a jet that is more gentle on the screen 8. When, however, a more massive clogging is sensed, or after predetermined time intervals, the computer-controlled valve 72 is opened, increasing flow and producing a sharper jet. An analogue device can also be used to control suction This device is particularly suitable for continuous filter flushing.

Another submerged filter is seen in FIG. 5. The filter housing 2 resembles that of the embodiment of FIG. 4. There are seen the inlet openings 4, the filter outlet 6 and its pump 60, and the housing flange 50 on which is mounted the plate 45 carrying the hydraulic cylinder 20. Also seen is line 27 which, originating in the clean-liquid space surrounding the cylindrical filter screen 8 and including a pump 29, supplies high-pressure nozzles 10. The nozzle system further includes the relatively large suction nozzles 10 attached to the outer tube 30, which is supported by the central tube 28 and leads into the sump 32, where the sucked-up filter deposits collect before being drawn off by the pump 74 which, being in this embodiment responsible for the suction effect, must be powerful enough to produce an underpressure of at least 0.5 atmospheres.

Yet another embodiment of the filter according to the invention is schematically illustrated in FIG. 6. In this embodiment, it is the filter screen 8, rather than the nozzles 10, 10', that rotates To this end, the cylindrical screen 8 is mounted between sealed bearings 46 and is set rotating by the friction offered by the relatively rough filter screen surface to the raw liquid introduced into the housing 2 via the tangentially oriented inlet 4. The bearings 46 are supported by two outlet sockets 6, of which either both or only one may be used for connection to clean liquid lines.

To reduce the length of the working stroke of the nozzles 10, 10', three nozzle pairs have been provided, the pressure nozzles 10 being connected to the inner tube 28 and the suction nozzles 10' being mounted on the outer tube 30 slidingly guided by the guide tube 14.

As in the embodiment of FIG. 5, the inner tube 28 and the outer tube 30 are fixedly connected to one another, their reciprocating movement being effected by the hydraulic cylinder 20, the piston 18 of which is rigidly connected with the inner tube 28. The high-pressure source HP is connected to the socket 76 inside which freely moves the lower, open portion of the inner tube 28, with an appropriate seal separating the HP socket 76 from the hydraulic cylinder 20. The low pressure LP acts on the upper end of the guide tube 14, through which the loaded flushing liquid exits.

In contradistinction to the filters of FIGS. 3, 4 and 5, flow in this filter takes place from the outside of the screen 8 towards the inside.

It should be noted that, with the embodiments having a cylindrical filter screen in which flow takes place from the inside towards the outside, the pitch of the helix described by the nozzles 10, 10' in their compound motion is such that during every full cycle of the nozzle system (which performs many rotations to a single up and down movement), the filter screen 8 is fully covered by the large suction nozzles 10', while coverage of every spot of the screen by the small pressure nozzles 10 follows only statistical probability.

In the filter according to FIG. 6, screen coverage follows similar criteria.

In filters of the type having a flat, fine-mesh filter screen 8, it is sometimes advantageous to use a second high-pressure nozzle 10, which, however, is arranged to act from the other side of the screen 8.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A self-cleaning filter comprising:
   a filter housing having at least one raw-liquid inlet and one clean-liquid outlet;
   a filter medium interposed between said raw-liquid inlet and said clean-liquid outlet;
   first pressure producing means for producing a pressure higher than the pressure prevailing in said filter housing;
   second pressure producing means for producing a pressure lower than the pressure prevailing in said filter housing;
   at least one nozzle located in proximity to said filter medium, means for selectively connecting said at least one nozzle to said first and second pressure producing means, and means to produce relative movement between said filter medium and said at least one nozzle to the effect of having a substantial part of the surface area of said filter medium covered by said nozzle.

2. The filter as claimed in claim 1, further comprising means to alternatingly connect said at least one nozzle to either one of said first and second pressure producing means.

3. The filter as claimed in claim 2, wherein said means for alternatingly connecting said at least one nozzle to either one of said pressure producing means is at least one controllable valve.

4. The filter as claimed in claim 3, further comprising another valve disposed upstream of said raw-inlet, and a duct leading to said at least one nozzle via one of said valves.

5. The filter as claimed in claim 1, wherein said movement-producing means is a hydraulic cylinder, the piston of which is linked to said at least one nozzle.

6. The filter as claimed in claim 1, wherein said filter medium is substantially flat and said relative movement is reciprocatingly translational.

7. The filter as claimed in claim 1, wherein said filter comprises at least two nozzles, which nozzles are located on opposite sides of said filter medium.

8. The filter as claimed in claim 1, wherein said filter comprises at least two nozzles, which nozzles are located on one of the same side of said filter medium.

9. The filter as claimed in claim 1, wherein said filter comprises at least two nozzles and wherein one of said nozzles is connected to said first pressure producing means, and the other one of said nozzles is connected to said second pressure producing means.

10. The filter as claimed in claim 1, wherein the area covering rate of said high-pressure nozzle is significantly lower than that of said low-pressure nozzle.

11. A self-cleaning filter, comprising:
   a) a filter housing having at least one raw-liquid inlet and one clean-liquid outlet;
   b) a substantially cylindrical filter medium interposed between said raw-liquid inlet and said clean-liquid outlet;
   c) first and second pressure-producing means for producing pressures different from the pressure prevailing in proximity to said filter housing;
   d) at least two nozzles located in proximity to said filter medium and respectively connected to said first and second pressure-producing means;
   e) first means to produce a relative, reciprocatingly translational movement between said filter medium and said at least two nozzles; and
   f) second means to produce a relative, rotational movement between said filter medium and said at least two nozzles, said translational and said rotational movements being superposed one upon the other to the effect of having a substantial part of said filter medium covered by said nozzles;
   g) wherein the pressure produced by said first pressure-producing means is higher than the pressure prevailing in said filter housing and the pressure produced by said second pressure-producing means is lower than the pressure prevailing in said filter housing.

12. The filter as claimed in claim 11, wherein there is provided at least one pair of nozzles, one nozzle of said at least one pair being mounted on, and communicating with, the inner one of two hollow, concentric shafts rigidly connected to one another, the other nozzle of said at least one pair of nozzles being mounted on, and communicating with, the outer one of said hollow shafts.

13. The filter as claimed in claim 11, wherein said first means to produce movement is a hydraulic cylinder having a piston, said cylinder being rotatable together with said piston and said nozzles.

14. The filter as claimed in claim 11, comprising high-pressure nozzles and low-pressure nozzles, wherein said low-pressure nozzles are connected to the lower ends of ducts leading in an upward direction to the outside of the filter housing, at least the upper portions of said ducts being outwardly inclined with respect to the axis of said rotational movement, wherein the source producing said low pressure is the centrifugal force generated in said outwardly inclined duct portions upon rotation thereof together with said nozzles.

15. The filter as claimed in claim 11, further comprising a pressure booster disposed upstream of said pressure source for said high-pressure nozzles, comprising a constricted portion in the pipe connecting said source of said nozzles, a relatively wide pipe section bypassing said constricted portion and a computer-controlled valve constructed and arranged to open or shut said bypassing pipe section.

16. The filter as claimed in claim 11, wherein said first and second pressure producing means comprise a first and second electric pump.

17. The filter as claimed in claim 11, further comprising a valve constructed and arranged to shut off said clean-liquid outlet.

18. The filter as claimed in claim 11, wherein said first means to produce a relative reciprocatingly translational movement is operative to impart a reciprocatingly translational movement to said nozzles, and said second means to provide a relative rotational movement is operative to impart a rotational movement to said filter medium.

19. The filter as claimed in claim 18 wherein said raw liquid inlet is tangentially oriented, thereby producing a rotational movement of said filter medium.

20. A self cleaning filter comprising:
   a) a filter housing having a fluid inlet and a fluid outlet;
   b) a filter medium interposed between said inlet and outlet for filtering fluid entering said housing through said inlet and exiting said housing through said outlet;
   c) a nozzle operatively oriented with respect to said filter medium;
   d) means mounting said nozzle in said housing for effecting relative lateral movement with respect to said filter medium;
   e) means for alternatively supplying to said nozzle a source of fluid having a pressure greater than the pressure in said housing thereby causing the last mentioned fluid to impinge on said filter medium, and a source of fluid having a pressure less than the pressure in said housing thereby causing fluid in the housing to be drawn into said nozzle through said filter medium.

21. A self cleaning filter comprising:
   a filter housing having a fluid inlet and a fluid outlet;
   b) a filter medium interposed between said inlet and outlet for filtering fluid entering said housing through said inlet and exiting said housing through said outlet;
c) at least one nozzle operatively oriented with respect to said filter medium;
d) means mounting said nozzle in said housing for effecting relative movement with respect to said filter medium;
e) means for alternatingly connecting said nozzle. to a source of fluid having a pressure higher than the pressure in said housing, thereby causing the last mentioned fluid to impinge on said filter medium, and to a source of fluid having a pressure lower than the pressure in said housing, thereby through said filter medium.

* * * * *

UNITED STATES PATENT AND TRADEMARK OFFICE
CERTIFICATE OF CORRECTION

PATENT NO. : 5,268,095
DATED : December 7, 1993
INVENTOR(S) : Ytzhak BARZUZA

It is certified that error appears in the above-indentified patent and that said Letters Patent is hereby corrected as shown below:

On the cover, in section [73], "Assignee", "Herslia," should be changed to ---Herzlia,---.

On the cover, in section [73], "Assignee", after "Filtration Ltd." insert ---(Assignment of one-half of assignor's interest)---.

At column 8, line 66 (claim 21, line 2), before "a" (first occurrence) insert ---a)---.

At column 9, line 8 (claim 21, line 12), change "nozzle." to ---nozzle---.

At column 10, line 5 (claim 21, line 17), after "thereby" insert ---causing fluid in the housing to be drawn into said nozzle---.

Signed and Sealed this

Ninth Day of September, 1997

Attest:

*Attesting Officer*

BRUCE LEHMAN

*Commissioner of Patents and Trademarks*